US008135716B2

(12) United States Patent
Stork et al.

(10) Patent No.: US 8,135,716 B2
(45) Date of Patent: Mar. 13, 2012

(54) SYSTEMS AND METHOD FOR MAPPING LARGE OBJECT DATA CONTENT IN A DATABASE TABLE TO A WORK AREA

(75) Inventors: Christian Stork, Bönen (DE); Andreas Blumenthal, Heidelberg (DE); Tobias Wenner, Nussloch (DE); Dirk Debertin, Karlsruhe (DE)

(73) Assignee: SAP AG, Walldorf (DE)

( * ) Notice: Subject to any disclaimer, the term of this patent is extended or adjusted under 35 U.S.C. 154(b) by 540 days.

(21) Appl. No.: 12/331,799

(22) Filed: Dec. 10, 2008

(65) Prior Publication Data
US 2010/0145942 A1 Jun. 10, 2010

(51) Int. Cl.
*G07F 17/30* (2006.01)
(52) U.S. Cl. ............... 707/740; 707/763; 707/803
(58) Field of Classification Search ............... None
See application file for complete search history.

(56) References Cited

U.S. PATENT DOCUMENTS

| | | | | |
|---|---|---|---|---|
| 7,260,585 B2* | 8/2007 | Krishnaprasad et al. | ..... | 707/694 |
| 7,716,255 B2* | 5/2010 | Stuhec | ..... | 707/803 |
| 7,730,056 B2* | 6/2010 | Kaiser et al. | ..... | 707/715 |
| 7,774,319 B2* | 8/2010 | Schweigkoffer et al. | ..... | 707/690 |
| 7,774,744 B2* | 8/2010 | Moore et al. | ..... | 717/104 |
| 7,831,634 B2* | 11/2010 | Petev et al. | ..... | 707/803 |
| 7,865,519 B2* | 1/2011 | Stuhec | ..... | 707/771 |
| 7,930,318 B2* | 4/2011 | Becker | ..... | 707/795 |
| 7,953,767 B2* | 5/2011 | Shaburov | ..... | 707/805 |
| 7,970,729 B2* | 6/2011 | Cozzi | ..... | 707/601 |
| 2005/0055358 A1* | 3/2005 | Krishnaprasad et al. | ..... | 707/100 |
| 2005/0055605 A1* | 3/2005 | Blumenthal et al. | ..... | 714/13 |
| 2006/0036574 A1* | 2/2006 | Schweigkoffer et al. | ..... | 707/2 |
| 2006/0143223 A1* | 6/2006 | Ivanova | ..... | 707/103 R |
| 2007/0033196 A1* | 2/2007 | Moore | ..... | 707/10 |
| 2008/0208855 A1* | 8/2008 | Lingenfelder et al. | ..... | 707/6 |

OTHER PUBLICATIONS

Schneider-Neureither, Andreas et al., 'The ABAP Developers Guide to Java, Chapter 6' 2005, SAP Press, pp. 5-10, 255-297, 485-495 (61 pages).*
Heilman, Rich, et al,. "Next Generation ABAP Development," May 2007, Galileo Press, pp. 1-22, 143-162, and 475-485 (48 pages).*
Kemper, Alfons, et al., "Performance Tuning for SAP R/3,"1997, IEEE Computer Society Technical Committee on Data Engineering, pp. 1-12.*
"Bulletin of the Technical Committee on Data Engineering," IEEE Computer Society, Jun. 1999, vol. 22, No. 2, pp. 1-52.*

* cited by examiner

*Primary Examiner* — Farhan Syed
(74) *Attorney, Agent, or Firm* — Buckley, Maschoff & Talwalkar LLC

(57) ABSTRACT

According to some embodiments, a programming language in an application server may include access to different database server implementations, wherein the programming language accesses content of database tables via work areas derived from the database tables. A database table, having columns to store content, each column being associated with a column type, may be mapped to a work area such that, at a database server, each column in the database table is mapped to a corresponding component of the work area, the corresponding component having a default component type based on the column type of the associated column in the database table. It may be determined that a particular column in the database table is to store large object data content, and, in response to the determination, a new mapping to a work area may be defined such that the particular column maps to a corresponding component having a component type other than the default component type.

11 Claims, 7 Drawing Sheets

SYSTEMS AND METHOD FOR MAPPING LARGE OBJECT DATA CONTENT IN A DATABASE TABLE TO A WORK AREA

FIELD

Some embodiments of the present invention relate to database tables and work areas. In particular, some embodiments may comprise systems and methods associated with mapping large object data content in a database table to a work area.

BACKGROUND

A database table may be arranged such that it includes multiple columns that store different types of content. Requests to the database table may then be received to read information from and/or write information into those columns. For example, different columns might store text information, numerical values, and/or other types of data. In some cases, portions of a database table will store "Large Object" (LOB) data content, such as in unlimited character string content (CLOB) and/or unlimited binary string content (BLOB) columns.

To efficiently access such LOB content, requests associated with "locators" and/or "streaming" may be provided in connection with a database server. A locator may be associated with a pointer to table column content and can accelerate access operations. However, these types of locators may require a considerable consumption of resources by the database server. In addition, streaming (e.g., as provided in JAVA documentation) may let data be accessed (including reading and writing) in a piecewise and/or sequential fashion.

An Open Structured Query Language (OpenSQL) environment may be associated with a set of Advanced Business Application Programming (ABAP) statements that perform operations on a central database, and the results of the operations (and any error messages) may be independent of the particular database system being used. In this way, OpenSQL may provide a uniform syntax and semantics that can be used in connection with multiple database implementations and/or vendors. Note, however, that OpenSQL does not provide a common syntax definition for locators and/or streaming requests.

Approaches that may improve access to LOB content in database tables could, therefore, be desirable. Moreover, it may be advantageous to provide such access in an efficient and convenient manner—even when a number of different database server implementations can be associated with a system.

DETAILED DESCRIPTION

A database table may include multiple columns that store different types of information, including LOB data content (e.g., CLOB or BLOB data content). Requests to the database table may then be received to read information from and/or write information into those columns. To efficiently access LOB data content, requests associated with "locators" and/or "streaming" may be provided. For example, a locator may be associated with a pointer to table column content to accelerate access operations.

Figure 1:
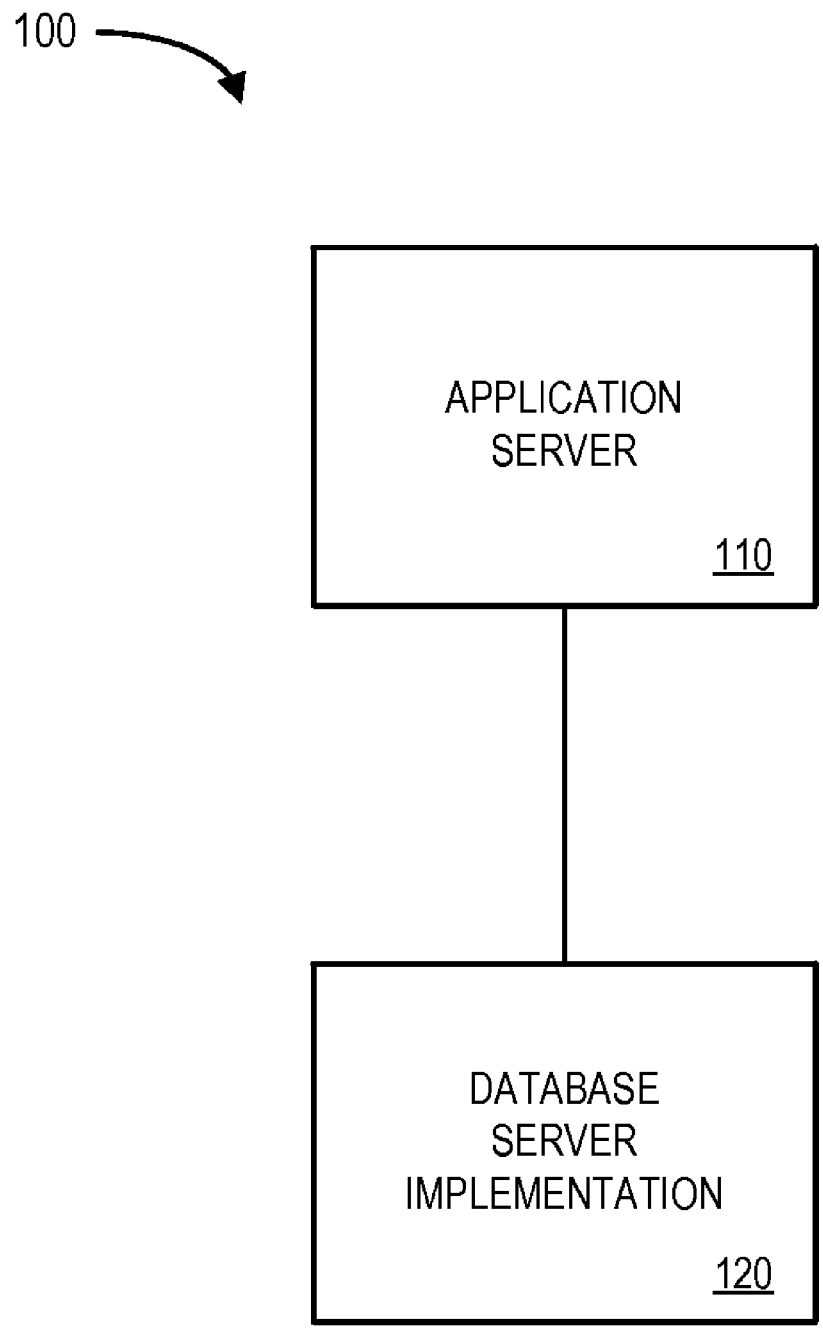
FIG. 1 is a block diagram of a system that may facilitate a mapping of a database table to a work area according to some embodiments.

An Open Structured Query Language (OpenSQL) environment may be associated with a set of Advanced Business Application Programming (ABAP) statements that perform operations on a central database, and the results of the operations (and any error messages) may be independent of the particular database system being used. In this way, OpenSQL may provide a uniform syntax and semantics that can be used in connection with multiple database implementations and/or vendors. For example, FIG. 1 is a block diagram of a system 100 wherein an application server 110 may be associated with a database server implementation 120 (e.g., although the database server implementation might, for example, be associated with any of a number of different venders). Note, however, that although OpenSQL provides a technique to develop software without dependency to a particular software system or vendor, it does not provide a common syntax definition for locators and/or streaming requests.

Figure 2:
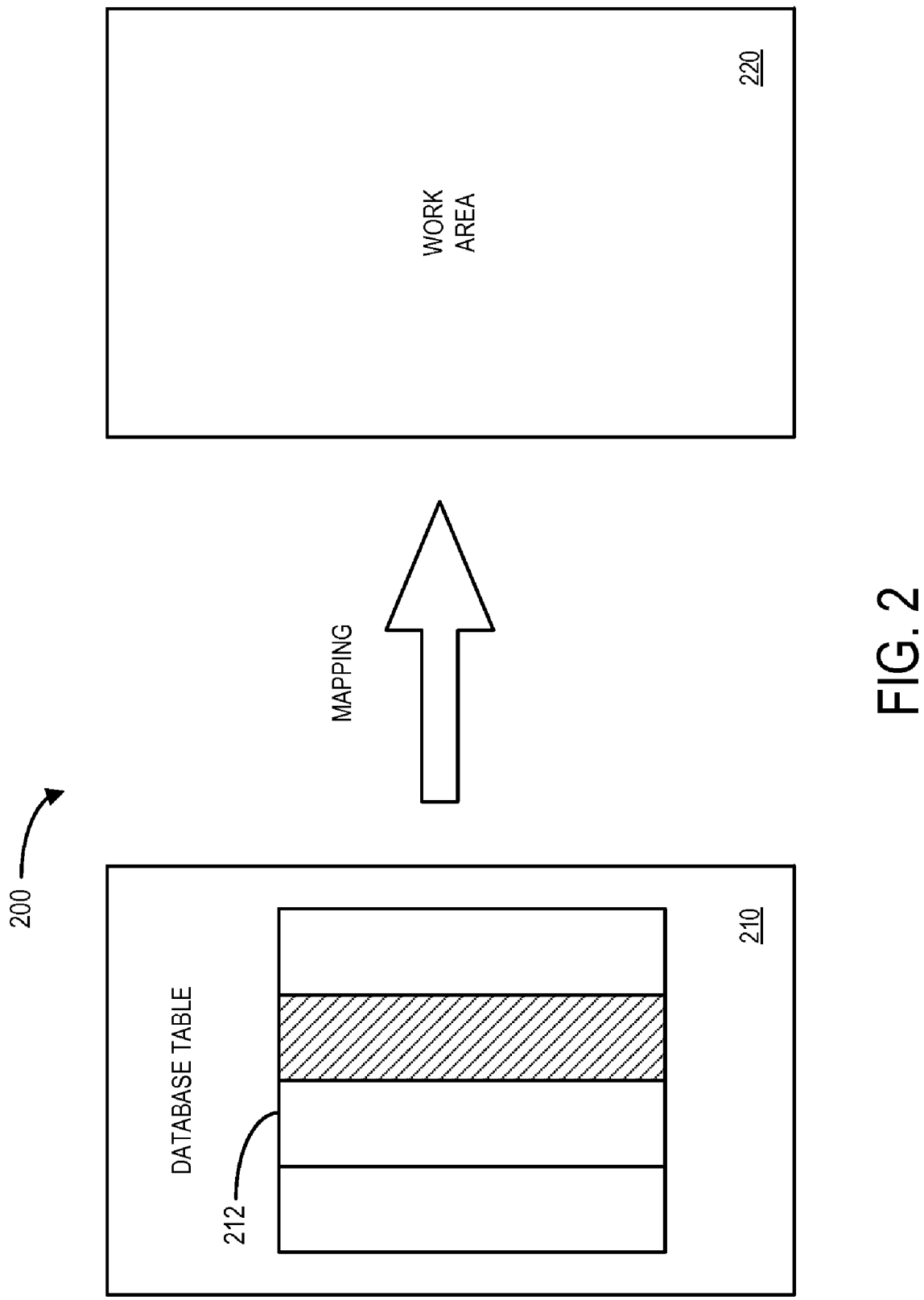
FIG. 2 is an illustration of a mapping of a database table to a work area according to some embodiments.

Also note that OpenSQL uses the concept of "work areas," which may include a list of host variables and can be the target for a SELECT statement or the source for an INSERT, UPDATE or MODIFY statement. Such a work area may include "components" that are each associated with a component type. For example, the illustration 200 of FIG. 2 shows how a database table 210 (including a number of columns 212 storing content) can be mapped to a work area 220. According to some embodiments provided herein, a type associated with the work area 220 may be defined such that a component can take a stream or a locator. Further note that a component might be typed explicitly by name to take a locator or stream (although a general typing might also be available in connection with the work area 220).

In some cases, the work area 220 might be defined manually by an operator. In other cases, the work area 220 may be typed based on types associated with columns 212 in the database table 210. A drawback of the first approach is that the type may need to be manually adapted to account for changes to the database table's existing columns 212 (or to an extension of the database table 210 when new columns 212 are added). That is, any assignment of a work area type to a particular component may need to be aware of changes or extensions of the database table 210 to adapt the type of the work area 220 as appropriate. Moreover, if a new LOB column 212 is added to a database table 210, it may be helpful to define in advance the usage of the new column 212 as a normal column (with a locator or with a stream).

Note that the typing of components in the work area 220 may be "generic" in the sense that a component might be prepared to take a stream or a locator, but at the same time it may be unknown in a static sense (e.g., at runtime a decision might need to be made as to whether the component should take a locator or a stream).

To alleviate problems inherent in the prior art, some embodiments of the present invention introduce systems, methods, computer program code, and means associated with mapping large object data content in a database table to a work area. Referring again to FIG. 1, the system 100 may facilitate a mapping of a database table to a work area according to some embodiments. The system 100 includes the application server 110 associated with a number of different database server implementations 120.

Note that some or all of the devices illustrated in FIG. 1 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Note that embodiments are not limited to any specific combination of hardware and software. Moreover, the devices described herein might, for example, support any of the protocols in the following non-exhaustive list: Java Database Connectivity (JDBC), Java Connector (JCO), P4, and Simple Object Access Protocol (SOAP). Moreover, the databases might comprise a relational database accessible via a SQL or OpenSQL interface and/or systems which provide intermediary "business intelligence" to data stored within the database. Further, any devices described herein might be associated with a server, a workstation, a Personal Computer (PC), or a mobile wireless device, such as a laptop computer, a Personal Digital Assistant (PDA), a tablet computer, a handheld computer, or any other suitable devices that are or become known.

Figure 3:
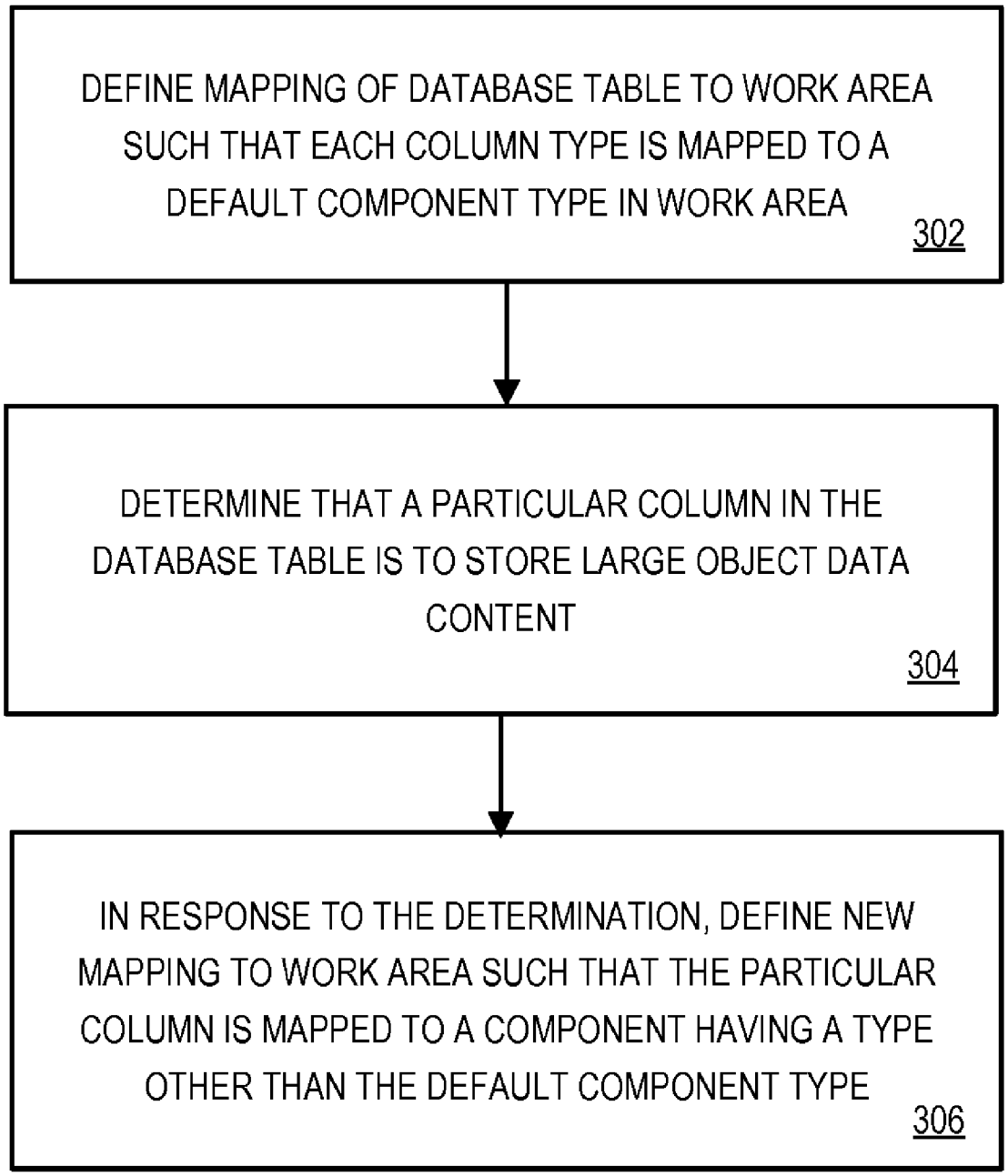
FIG. 3 is a flow diagram of a method pursuant to some embodiments.

FIG. 3 is a flow diagram of process steps that might be associated with the system 100 of FIG. 1 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

The method of FIG. 3 might be associated with, for example, a programming language in an application server that includes access to different database server implementations, wherein the programming language accesses content of database tables via work areas derived from the database tables. By way of example only, the programming language might be associated with OpenSQL.

At 302, a mapping associated with a database table may be defined. Consider, for example, the database table 210 of FIG. 2. In this case, the table 210 includes columns 212 that store content, and each column may be associated with a column type. At 302, the database table 210 might be mapped to the work area 200 such that, at a database server, each column 212 in the database table 210 is mapped to a corresponding component of the work area 220. Consider, for example, a structure that consists of a number of components where each component has a simple type (e.g., an integer type or a character string type). Moreover, a database may have a pre-defined set of simple types such as integers, character fields, LOBs, and the programming language in the application server may also have a predefine set of simple types. Thus, there may be a given default mapping of the predefined database simple types to the predefined programming language simple types. That is, the corresponding component in the work area 220 may have a "default component type" based on the column type of the associated column 210 in the database table 210. Further note that access to a LOB column via a locator or a stream is not part of such default mapping.

At 304, it may be determined that a particular column 212 in the database table 210 is to store large object data content. For example, it might be determined that the column 212 illustrated with cross-hatching in FIG. 2 is to store CLOB or BLOB data content.

In response to the determination at 304, a new mapping to the work area 220 may be automatically defined at 306 such that the particular column 212 will map to a corresponding component having a component type other than the default component type. That is, the default component type might not be appropriate because that particular column has been identified as including LOB data content (and a special case mapping may be defined instead to provide locator and/or stream access).

Figure 4:
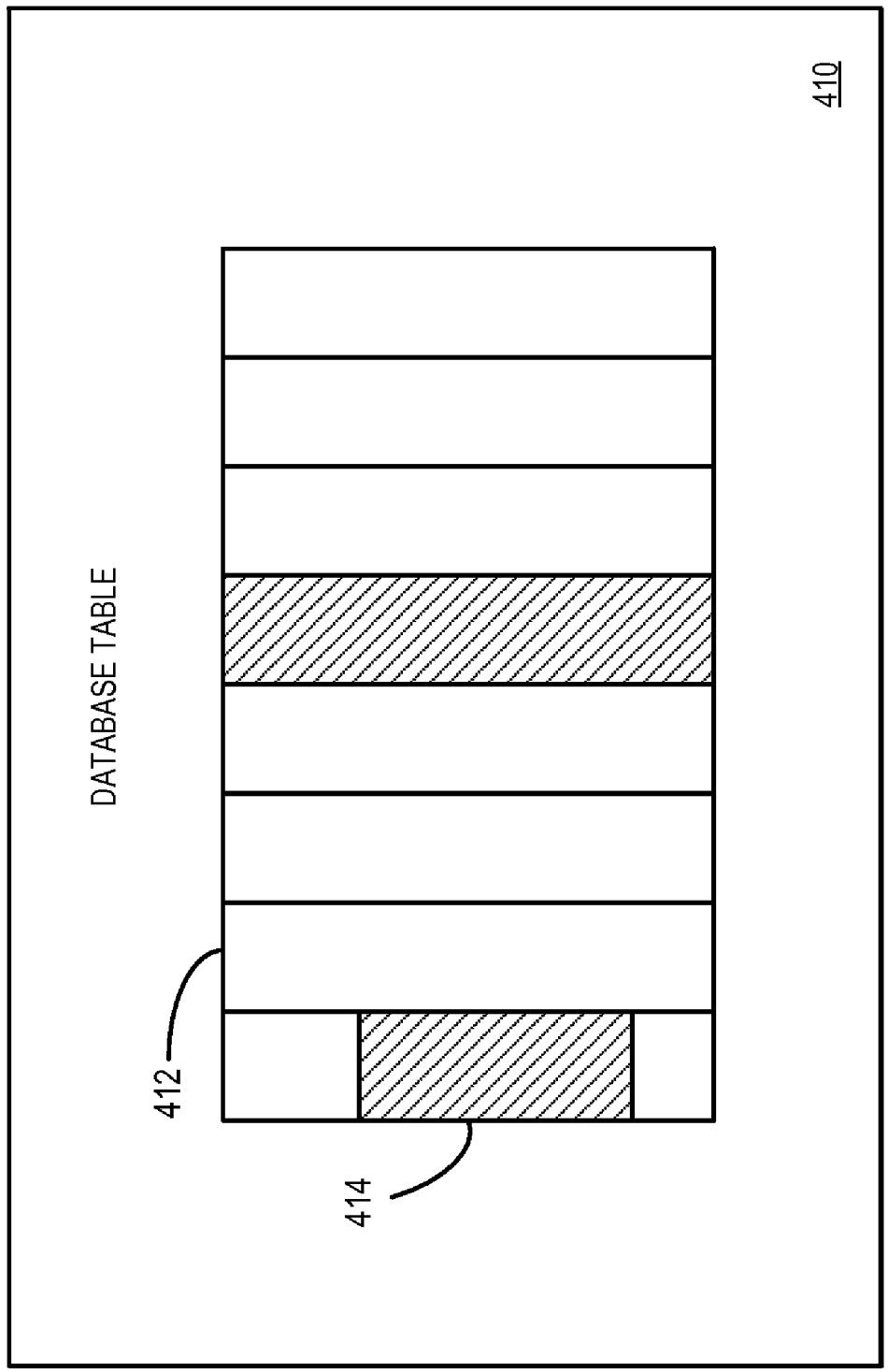
FIG. 4 illustrates database table content according to some embodiments.

As a result of the new mapping performed at 306, the programming language might be used to access a sub-portion of the large object data content. Consider FIG. 4 which illustrates a database table 410 storing content in columns 412 according to some embodiments. In this case, the mapping performed at 306 may let a sub-portion 414 of a column be accessed. Such an approach may avoid the need to copy an entire column of information and improve the performance of the system (especially since the LOB data content might be relatively large). Note that the accessing of the sub-portion of the LOB data content might be performed, for example, by changing the content of the LOB data via a locator.

Figure 5:
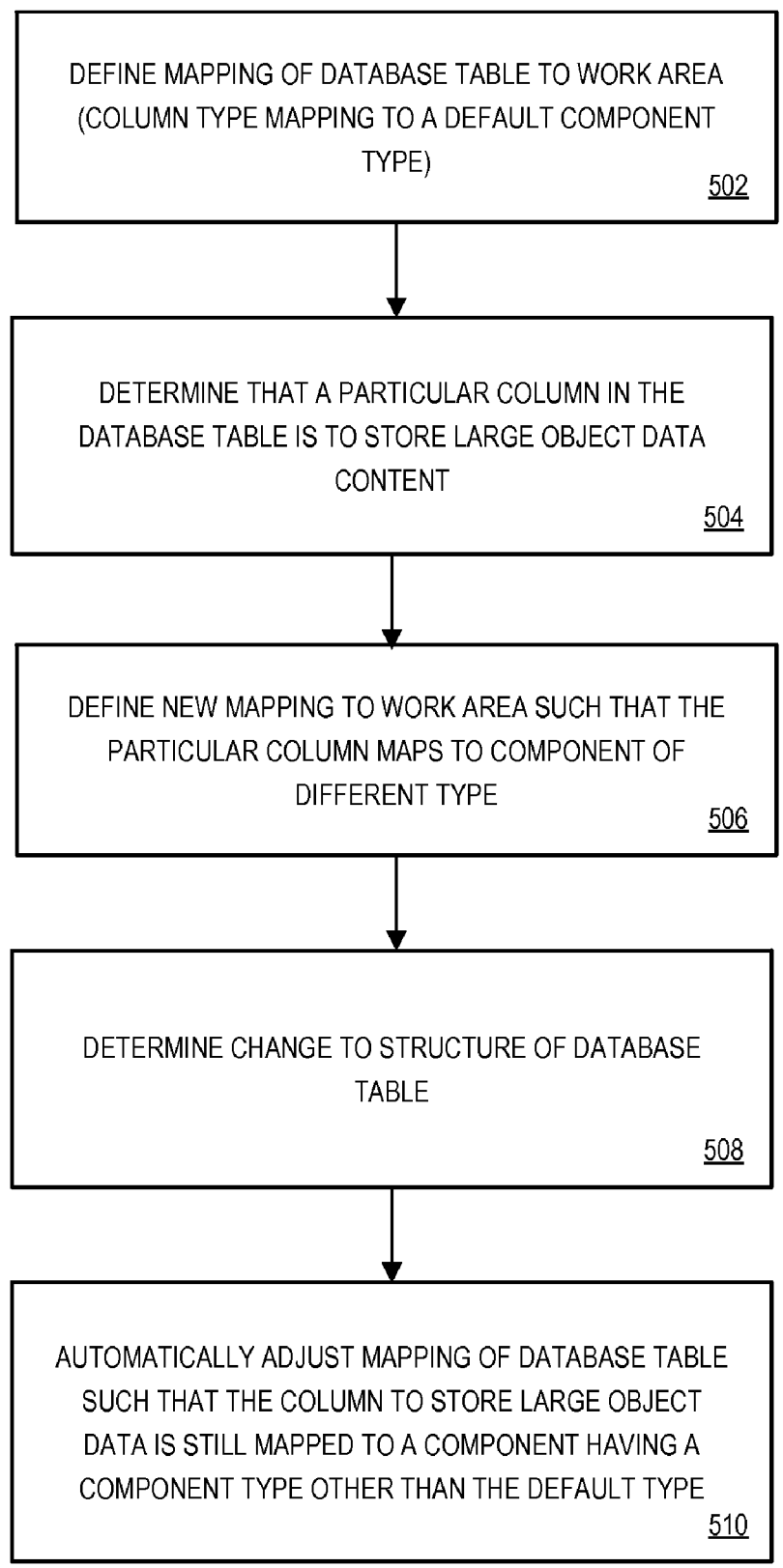
FIG. 5 is a flow diagram of process steps associated with mapping a database table to a work area pursuant to some embodiments.

FIG. 5 is a flow diagram of process steps associated with mapping a database table to a work area pursuant to some embodiments. In this example, the OpenSQL for ABAP programming language accesses content of database tables via work areas derived from the database tables. At 502, a mapping associated with a database table is such that each column in the database table is mapped to a corresponding component of a work area. Moreover, the corresponding component in the work area has a "default component type" based on the column type of the associated column in the database table.

At 504, it is determined that a first column in the database table stores large object data content. In response to this determination, a new mapping to the work area is automatically defined at 506 such that the first column maps to a corresponding first component having a component type other than the default component type.

At 508, a change to a structure of the database table is determined. For example, a new column might have been added to the table (causing other columns in the table to be shifted to the right). Responsive to the change to the structure of the database table, an "automatic" adjustment of the mapping of the database table to the work area is performed at 510 such that the first column is still mapped to a component having a component type other than the default component type. As used herein, a mapping or a mapping adjustment may be "automatic" if it requires little or no manual intervention by an operator.

As there may be no common interface defined in OpenSQL to use locators or streams, according to some embodiments provided herein realize locators and streams in ABAP as classes. By way of example only, the classes might comprise:

CL_ABAP_DB_C_LOCATOR,
CL_ABAP_DB_X_LOCATOR,
CL_ABAP_DB_C_READER,
CL_ABAP_DB_X_READER,
CL_ABAP_DB_C_WRITER, and
CL_ABAP_DB_X_WRITER.

(where "C" may represent character data and "X" may represent binary data). Given a work area compatible to a database table with CLOB or BLOB columns, a new work area may be defined that has reference variables of the appropriate locator or stream class, and as a result, a SELECT or an INSERT, UPDATE or MODIFY statement with locator or streams may be possible.

Consider, for example, a table "dbtab" with a key column KEY1 and a CLOB column CLOB1. Moreover, a work area "wa" is defined with a component KEY1 with type of the key column of dbtab. The second component CLOB1 has the type REF TO CL_ABAP_DB_C_LOCATOR. In this case, the statements:

SELECT*INTO wa FROM dbtab.
ENDSELECT.

will retrieve for every line in dbtab a locator object in wa-clob1 (and, similarly, you may retrieve a stream reader). That is, the statements define a loop to get every row of a database table in a work area (and inside that loop, additional statements would be provided to access portions of LOB data content). For modification operations such as INSERT, UPDATE or MODIFY, the modification statement may create a stream writer, if wa-clob1 has type REF TO CL_ABAP_DB_C_WRITER.

One aspect of some embodiments provided herein is how to define such work areas to get locator objects or stream objects. Although this might be done manually (or "by hand"), such an approach will not automatically adjust the mapping when changes are made to the database. According to some embodiments, an extension is provided to define a new type depending on the database table type that will be updated if the database table type is changed.

Note that as a result of the new mapping performed at 510, the programming language may be used to read a sub-portion of the LOB data content via the work area with a SELECT statement. For example, reading via the work area as a target might be associated with an interface IF_ABAP_DB_LOB_HANDLE implemented with at least one of: (i) CL_ABAP_DB_C_LOCATOR and CL_ABAP_DB_X_LOCATOR for a locator, or (ii) CL_ABAP_DB_C_READER, CL_ABAP_DB_X_READER for a stream reader.

Similarly, as a result of the new mapping performed at 510, the programming language might be used to write to a sub-portion of the LOB data content via the work area with at least one of an INSERT statement, an UPDATE statement, or a MODIFY statement. For example, writing via the work area as a source might be associated with at least one of: (i) CL_ABAP_DB_C_LOCATOR and CL_ABAP_DB_X_LOCATOR for a locator, or (ii) CL_ABAP_DB_C_WRITER, CL_ABAP_DB_X_WRITER for a stream writer.

According to some embodiments, a new type may be defined for work areas in accordance with one or more rules. For example, consider an interface IF_ABAP_DB_LOB_HANDLE that is implemented by CL_ABAP_DB_C_LOCATOR. CL_ABAP_DB_X_LOCATOR, CL_ABAP_DB_C_READER and CL_ABAP_DB_X_READER. In this case, the definition of the access will be done during runtime.

Note that there are two kinds of work areas that may need to be distinguished: (1) work areas for SELECTs and (2) work areas for INSERT, UPDATE and MODIFY. For SELECT work areas, each of LOCATOR, READER and LOB HANDLE may be allowed as types. For INSERT, UPDATE and MODIFY work areas, each of LOCATOR and WRITER may be allowed.

In some cases, an explicit enumeration of the corresponding LOB columns may be provided. By way of example, an enumeration might be provided as follows: TYPES wa TYPE db_tab LOCATOR FOR COLUMNS clob1. According to some embodiments, a global definition for all columns, for all CLOB columns, and/or for all BLOB columns may be provided, such as by: TYPES wa TYPE db_tab READER FOR ALL COLUMNS. According to still other embodiments, a global definition may be provided for all "other columns," for all other CLOB columns, and/or all other BLOB columns, such as by: TYPES wa TYPE db_tab WRITER FOR COLUMNS blob1 LOCATOR FOR ALL OTHER BLOB COLUMNS.

Note that various embodiments described herein might be mixed, although the sets of columns defined by one may need to have an empty intersection and an explicit enumeration of LOB columns might be supported only at the end of the definition. By way of example, the following might define a type for work areas: TYPES wa TYPE db_tab LOB HANDLE FOR ALL BLOB COLUMNS LOCATOR FOR COLUMNS clob1 READER FOR ALL OTHER CLOB COLUMNS.

Further note that that in some embodiments, all sets that can be a union should be defined and/or described as a union. For example, the possible situation: READER FOR COLUMNS clob1 READER FOR ALL OTHER CLOB COLUMNS may preferably be: TYPES wa TYPE db_tab LOB HANDLE FOR ALL BLOB COLUMNS READER FOR ALL CLOB COLUMNS.

According to some embodiments, if the database table is extended (e.g., by adding new columns), then the extension FOR ALL [OTHER] [CLOB|LOB] columns may guarantee the typing of new LOB columns for locator access, stream access, and/or a generic typing via LOB HANDLE.

In some cases, a work area for a SELECT will be "generic" in the sense that there exists a generic reference of type REF TO IF_ABAP_DB_LOB_HANDLE for a LOB column, then the locator or stream may need to be created during the SELECT with additional information. According to some embodiments, this additional information may be given via a CREATING extension. Some rules for a CREATING extension might include:

1. Only LOCATOR and READER might be allowed as types.

2. An explicit enumeration of the corresponding LOB columns may be provided, such as by the following statements:
TYPES wa TYPE db_tab LOB HANDLE FOR COLUMNS clob1.
SELECT*FROM db_tab INTO wa CREATING READER FOR COLUMNS clob1.
ENDSELECT.

3. A global definition for all columns, for all CLOB columns, and/or for all BLOB columns might be provided, such as by: TYPES wa TYPE db_tab LOB HANDLE FOR COLUMNS.

Figure 6:
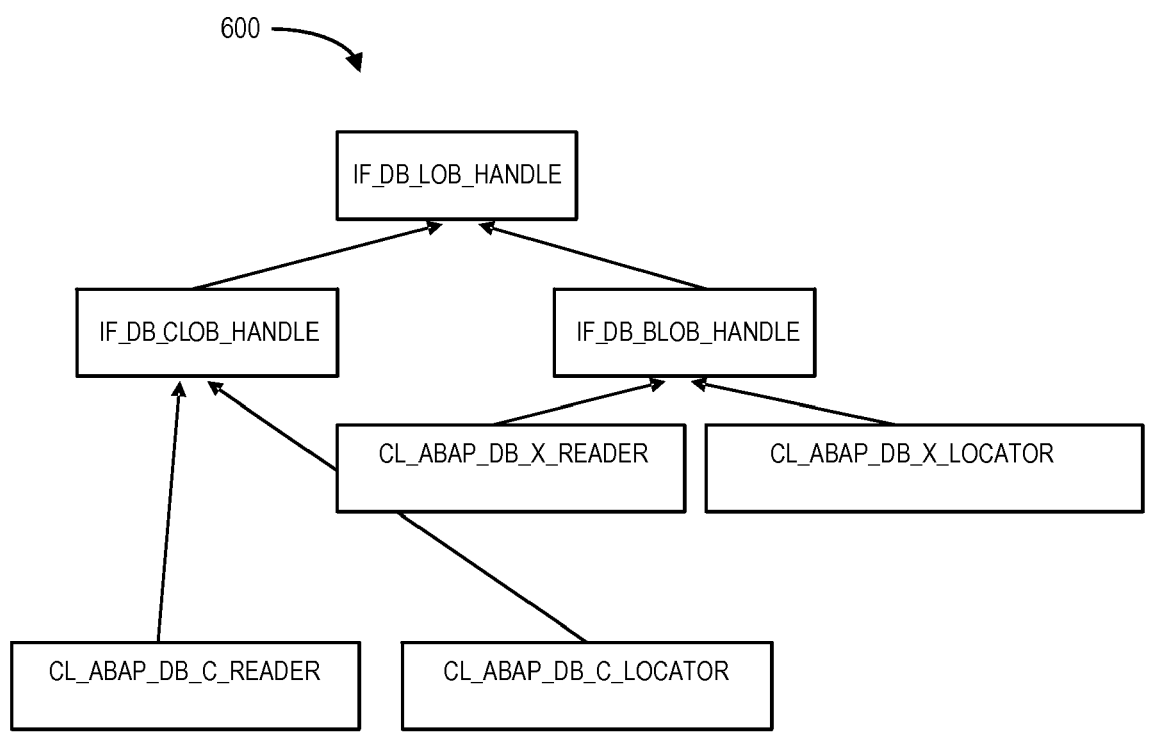
FIG. 6 illustrates several classes associated with LOB content according to some embodiments.

Note that some embodiments may provide a common interface for streams and locators. Moreover, at the interplay between streaming and locator classes, note that streaming classes might be divided into two types: reader and writer classes. FIG. 6 illustrates several classes 600 that may be provided according to some embodiments. In particular, note that the general LOB_HANDLE is broken into a CLOB_HANDLE and BLOB_HANDLE portions (which are further broken into reader and locator classes).

Figure 7:
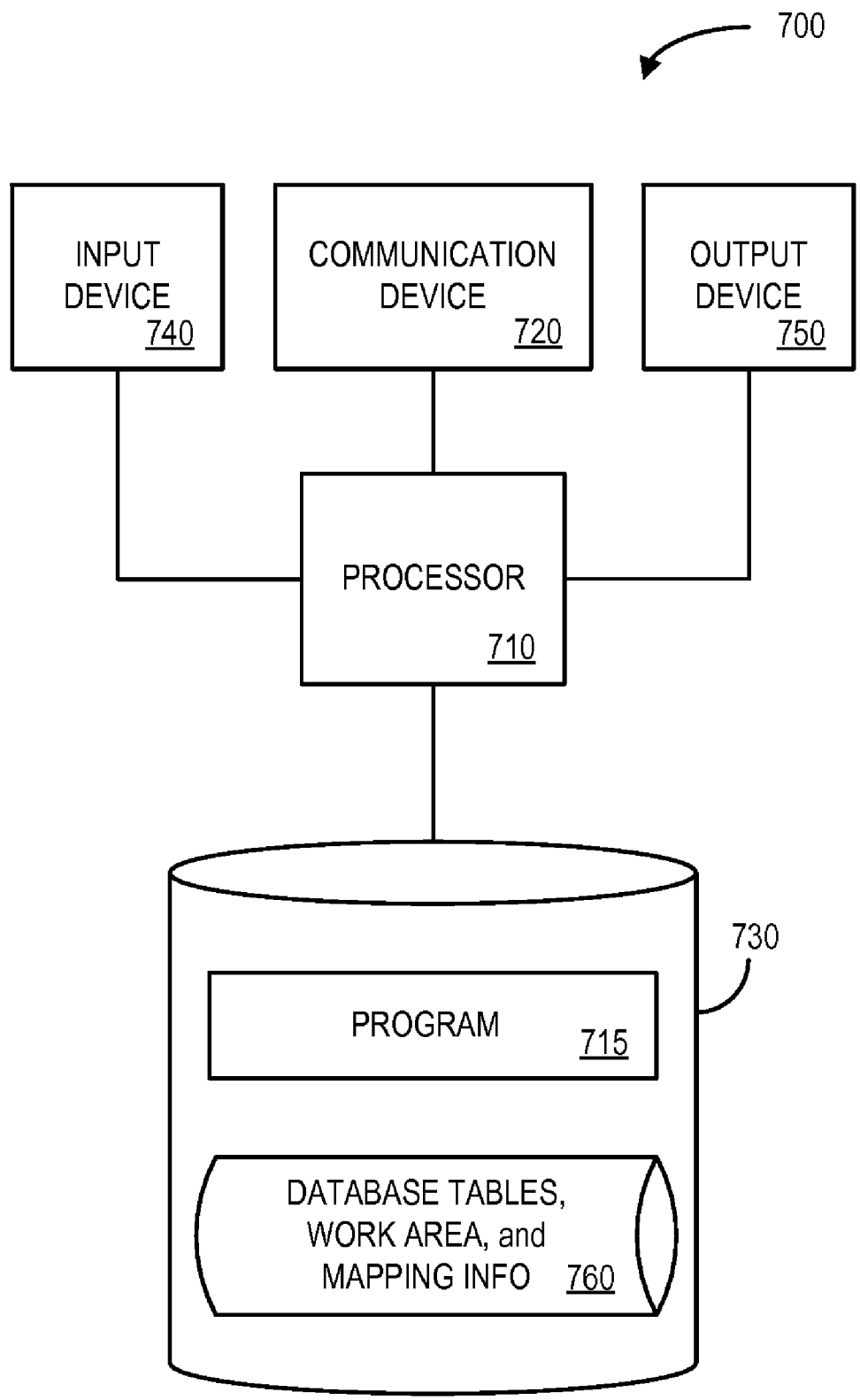
FIG. 7 is a block diagram of an apparatus according to some embodiments.

FIG. 7 is a block diagram of an apparatus 700 in accordance with some embodiments of the present invention. The apparatus 700 might, for example, facilitate a mapping of a database table to a work area in connection with an application server 1120 and/or database server implementation 120 illustrated in FIG. 1. The apparatus 700 comprises a processor 710, such as one or more INTEL® Pentium® processors, coupled to a communication device 720 configured to communicate via a communication network (not shown in FIG.

7). The communication device 720 may be used to exchange database and/or mapping information with remote devices.

The processor 710 is also in communication with an input device 740. The input device 740 may comprise, for example, a keyboard, a mouse, or computer media reader. Such an input device 740 may be used, for example, provide mapping rules or other information associated with a database table or work area. The processor 710 is also in communication with an output device 750. The output device 750 may comprise, for example, a display screen or printer. Such an output device 750 may be used, for example, to provide reports and/or display information associated with database tables, mapping, and/or work areas.

The processor 710 is also in communication with a storage device 730. The storage device 730 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein. For example, the processor 710 may map a database table, having columns to store content, each column being associated with a column type, to a work area such that, at a database server, each column in the database table is mapped to a corresponding component of the work area, the corresponding component having a default component type based on the column type of the associated column in the database table. Moreover, the processor 710 may determine that a particular column in the database table is to store large object data content. In response to the determination, the processor may automatically define a new mapping to a work area such that the particular column maps to a corresponding component having a component type other than the default component type.

As used herein, information may be "received" by or "transmitted" to, for example: (i) the apparatus 700 from other devices; or (ii) a software application or module within the apparatus 700 from another software application, module, or any other source. As shown in FIG. 7, the storage device 730 may also store database tables, work area, and/or mapping information 760 according to some embodiments. The information 760 may, for example, be generated and/or consumed by the processor 710.

The illustration and accompanying descriptions of devices and databases presented herein are exemplary, and any number of other arrangements could be employed besides those suggested by the figures. For example, multiple database tables and/or work areas associated with different types of business information or financial data might be associated with the apparatus 700.

Thus, embodiments may facilitate improved access to LOB content in database tables. Moreover, such access may be simplified and provided in an efficient and convenient manner—even when a number of different database server implementations are associated with a system.

The several embodiments described herein are solely for the purpose of illustration. Persons skilled in the art will recognize from this description other embodiments may be practiced with modifications and alterations limited only by the claims.

What is claimed is:

1. A computer-implemented method associated with a programming language in an application server that includes access to different database server implementations, wherein the programming language accesses content of database tables via work areas derived from the database tables, comprising:
defining mapping of a database table, having columns to store content, each column is associated with a column type, to a work area such that, at a database server, each column in the database table is mapped to a corresponding component of the work area, the corresponding component having a default component type based on the column type of the associated column in the database table;
determining that a particular column in the database table is to store large object data content; and
in response to the determination, automatically defining a new mapping to a work area such that the particular column maps to a corresponding component having a component type other than the default component type, wherein, as a result of said new mapping, the programming language accesses a sub-portion of the large object data content by changing the content of the large object data content via a locator and the programming language reads a sub-portion of the large object data content via the work area with a SELECT statement associated with an interface IF_ABAP_DB_LOB_HANDLE implemented with at least one of: (i) CL_ABAP_DB_C_LOCATOR and CL_ABAP_DB_X_LOCATOR for a locator; or (ii) CL_ABAP_DB_C_READER, CL_ABAP_DB_X_READER for a stream reader.

2. The method of claim 1, further comprising:
determining a change to a structure of the database table; and
responsive to the change to the structure of the database table, automatically adjusting the mapping of the database table to the work area such that the column to store large object data content is still mapped to a component having a component type other than the default component type.

3. The method of claim 1, wherein the application server is associated with the programming language ABAP.

4. The method of claim 3, wherein the programming language comprises the OpenSQL for ABAP.

5. The method of claim 1, wherein the large object data content comprises unlimited character string large object data content.

6. The method of claim 1, wherein the large object data content comprises unlimited binary string large object data content.

7. An apparatus, comprising:
a memory;
a processor executing instructions in memory;
an application server associated with a programming language that includes access to different database server implementations, wherein the programming language accesses content of database tables via work areas derived from the database tables; and
a map definition component to: (i) define mapping of a database table, having columns to store content, each column is associated with a column type, to a work area such that, at a database server, each column in the database table is mapped to a corresponding component of the work area, the corresponding component having a default component type based on the column type of the associated column in the database table, (ii) determine that a particular column in the database table is to store large object data content, and (iii) in response to the determination, automatically defining a new mapping to a work area such that the particular column maps to a corresponding component having a component type other than the default component type, wherein, as a result of said new mapping, the programming language accesses a sub-portion of the large object data content by changing the content of the large object data content via a locator and the programming language reads a sub-portion of the large object data content via the work area with a SELECT statement associated with an interface IF_ABAP_DB_LOB_HANDLE implemented with at least one of: (i) CL_ABAP_DB_C_LOCATOR and CL_ABAP_DB_X_LOCATOR for a locator; or (ii) CL_ABAP_DB_C_READER, CL_ABAP_DB_X_READER for a stream reader.

8. The apparatus of claim 7, wherein said map definition component is further to: (i) determine a change to a structure of the database table, and (ii) responsive to the change to the structure of the database table, automatically adjust the mapping of the database table to the work area such that the column to store large object data content is still mapped to a component having a component type other than the default component type.

9. A non-transitory computer-readable medium storing processor-executable process steps that, when executed by a processor, performs a method associated with a programming language in an application server that includes access to different database server implementations, wherein the programming language accesses content of database tables via work areas derived from the database tables, wherein the method comprises:

defining mapping of a database table, having columns to store content, each column is associated with a column type, to a work area such that, at a database server, each column in the database table is mapped to a corresponding component of the work area, the corresponding component having a default component type based on the column type of the associated column in the database table;

determining that a particular column in the database table is to store large object data content; and in response to the determination, automatically defining a new mapping to a work area such that the particular column maps to a corresponding component having a component type other than the default component type, wherein, as a result of said new mapping, the programming language accesses a sub-portion of the large object data content by changing the content of the large object data content via a locator and the programming language reads a sub-portion of the large object data content via the work area with a SELECT statement associated with an interface IF_ABAP_DB_LOB_HANDLE implemented with at least one of: (i) CL_ABAP_DB_C_LOCATOR and CL_ABAP_DB_X_LOCATOR for a locator; or (ii) CL_ABAP_DB_C_READER, CL_ABAP_DB_X_READER for a stream reader.

10. The medium of claim 9, wherein said accessing of the sub-portion of the large object data content is performed using either of: (i) a locator access, or (ii) a stream access.

11. The medium of claim 9, wherein the method further comprises:

determining a change to a structure of the database table; and responsive to the change to the structure of the database table, automatically adjusting the mapping of the database table to the work area such that the column to store large object data content is still mapped to a component having a component type other than the default component type.

\* \* \* \* \*